Dec. 29, 1931.  E. N. WANTZ  1,838,508
CASING FOR UVIARC LAMPS
Filed June 14, 1928
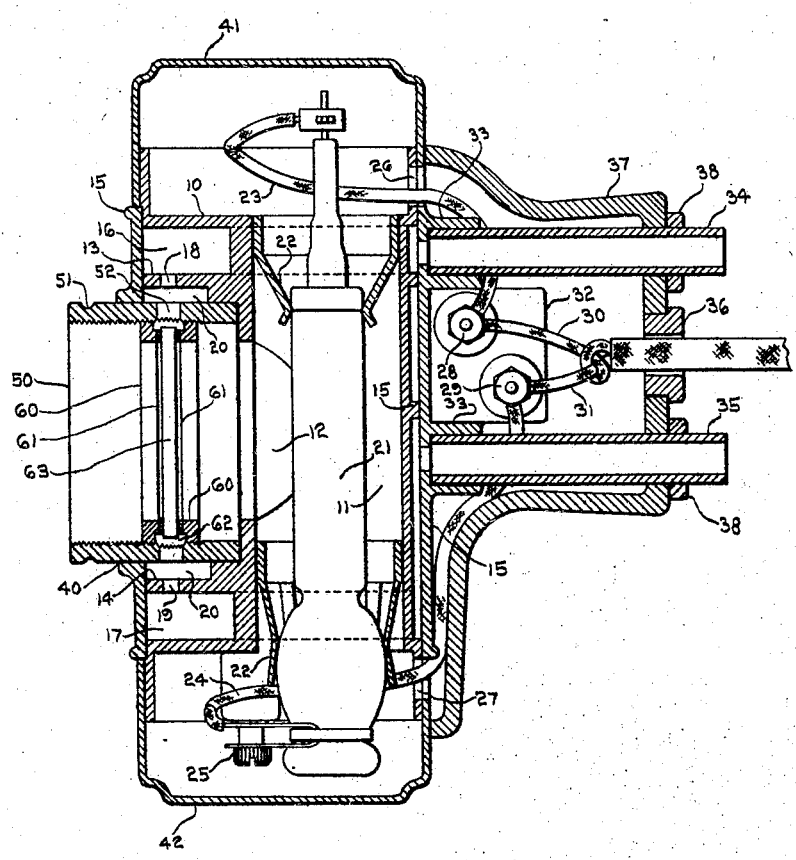
INVENTOR
EDWARD N. WANTZ
BY
ATTORNEY Patented Dec. 29, 1931

1,838,508

UNITED STATES PATENT OFFICE

EDWARD N. WANTZ, OF OAK PARK, ILLINOIS, ASSIGNOR TO GENERAL ELECTRIC X-RAY CORPORATION

CASING FOR UVIARC LAMPS

Application filed June 14, 1928. Serial No. 285,333.

The present invention has particularly to do with a lens mounting for an ultra-violet apparatus or for other heat generating units, and is illustrated as relating to what is commonly known in the art as an uviarc burner.

In the present type of apparatus for the generation of ultra-violet radiation, there is a generation of heat. It has heretofore been impossible to employ in connection with the human body such a burner without protective measures for the patient. Such protective means have ordinarily comprised a lens or a plurality of lenses through which the ultra-violet radiation reaches the patient.

Windows of quartz lens are now ordinarily employed. Double windows have been devised. In order that the lens and the adjacent portion of the lamp can be kept at a proper temperature, water-cooling is resorted to. The intense heat from the burner has made it impossible to employ the burner without a cooling means, and the present invention relates particularly to a cooling means for a lens comprising the window in such a burner, or for any other lens which is used in juxtaposition to a heat generating unit.

As previously indicated, it is not new to cool a lens by water, but no highly efficient means for so doing has so far been found. The present invention is for the purpose of improving lens cooling instrumentalities.

Double quartz windows with a flow of water therebetween are very inefficient for there is too great an absorption of the ultra-violet rays by the water and the double lens.

The present invention, taking advantage of the fact that a lens kept cool at its edges is generally sufficiently cool for all purposes, disposes the cooling means for such lens only at its edges so that the ultra-violet radiation does not penetrate water, but merely the single quartz lens itself. The faces of the quartz lens therefore remain free from deposits from the cooling medium which are annoying in the event the lens is submerged in water or has water circulating on the sides thereof.

Notwithstanding the resort to distilled water in the cooling systems for such devices as these, there seems to be some disintegration or decomposition of the water as an incident to its exposure to the ultra-violet ray or from contamination due to contact with the various elements of the water circuit, such as the pump, radiator, and piping, with the result that the lens shortly becomes clouded or inpenetrable, or the penetration of the ultra-violet ray therethrough is reduced below the point of efficiency.

From the foregoing, it will be readily understood that the invention resides, first, in cooling the quartz lens itself from its edge, in the structure which is employed for such purpose, and for the holder for the quartz lens.

In carrying out the objects of the invention hereinabove described, a structure similar to that illustrated in the accompanying drawings may be employed. The objects of the invention, which include, among others, those hereinafter listed, may be obtained by such a construction.

The objects referred to include:

A new and novel means for mounting a window or lens used in an ultra-violet lamp or other heat generating device;

Novel and unique means for the cooling of a lens in association with an ultra-violet burner or other heat generating apparatus;

Unique cooling means for a lens employed in association with a heat radiating device;

New and unique lens mounting and cooling means adapted to be used in association with ultra-violet radiation; and The shortening of the exposure time of a patient to attain the desired results.

These, and such other objects as may hereinafter appear, are attained by the novel construction, combination, and association of the various elements appearing in the illustrative embodiment of the invention, shortly now to be described.

Reference should be had to the single figure shown in the accompanying drawing and which comprises a vertical section through the center of a burner casing parallel to the beam of ultra-violet projection therefrom.

Like reference characters are used to designate similar parts in the drawing and in the description of the embodiment of the invention hereinafter recited.

The burner comprises two castings, a body and a casing, two caps, a window sleeve, a handle, and the necessary cooling conduits, together with the burner in the casing and the lens in the sleeve.

The burner construction includes a main body 10, which is a casting which has a rear vertically cylindrical open section 11 in which a burner is disposed. The main body 10 is generally cylindrical in configuration and at its top and bottom has perpendicular flanges to receive cylindrical top and bottom caps 41 and 42 which form a part of the outer casing for the burner.

The central cylindrical portion 11 has a flanged opening or aperture 12 through which ultra-violet radiation may pass in the form of a beam, it being this beam of ultra-violet radiation which penetrates the lens and is given utility. The novel mounting and cooling of the lens through which such beam passes forms the subject matter of this application for Letters Patent.

Body 10 comprises adjacent to the top and bottom flange portions cylindrical vanes 13 and 14 in alignment with said flanges at the outer edges and horizontally parallel in disposition. Said vanes or fins 13 and 14 are perforated or have passages therethrough as later pointed out.

The rear portion of said body 10 includes a vertical flanged grove extending downwardly and opening into the passage between vane 14 and the bottom cap receiving flange.

The passages formed between 13 and 14 and the contiguous flanged top and bottom sections of body 10 lead to the front of body 10 where the space therebetween is deepest, such cooling space being designated chambers 16 and 17. From chambers 16 and 17 passages or apertures 18 and 19 open through the vanes 13 and 14 to a circular chamber 20, a space wholly surrounding the lens and lens-holding means shortly to be described and adapted to be filled with the cooling medium, such medium being adapted to flow around or about the flange opening 12 so that such medium may circulate about cylinder 11 freely. The rapidity of the flow of such medium will be greatest about or through the chamber 20 where such medium is directly under the influence of the pressure applied to the cooling medium.

For holding a burner 21 in proper position within the body 10 and in cylinder 11, fingers 22 are arranged at spaced intervals at the top of the cylindrical body 11, said fingers being adapted to engage a shoulder in the burner especially provided therefor as illustrated.

The bottom bulb-like portion of the burner 21 is secured in position by fingers 22 likewise arranged in spaced relation at the bottom of space 11, such fingers being adapted to impinge the outer portion of the bulbous part of the burner 21.

Cables 23 and 24 are arranged to provide a flow of electromotive force to the burner 21. The cable 23 is provided with a clip connected to the top electrode of the burner while the cable 24 is electrically connected to the contact member 25 at the bottom of said burner which contact is secured to the member 10. Said cables are adapted to pass through apertures 26 and 27 in the top and bottom flanges of the body 10 and are secured to binding posts 28 and 29 arranged at the back of the burner upon a lug 32 projecting from the casing therefor and from which cables 30 and 31 run to a single enclosing cable which cable extends to a proper source of power.

Concentric with and secured to the member 10 is a casing 15 which has a flanged window 40 coinciding with and concentric with the window 12. Said casing extends partly onto the flanged top and bottom of body 10 so as to seal and form a cooling medium passage between said flanged top and bottom and the fins 13 and 14, as well as enclose said body 10 and provide the chambers 16 and 17 and 20.

Secured to the casing 15 are flanged connections 33 adapted to receive pipes 34 and 35 for the supply of cooling medium to the burner, one providing an inlet and the other an outlet for such cooling medium. Surrounding the rear of casing 15 the nipples 33, the lug 32, and the binding posts 28 and 29, and possessing a central aperture having insulated collar 36 thereabout, through which a cable passes, is a hollow handle 37 for the burner, which provides additional security in the way of fastening nuts 38 impinging upon the pipes 34 and 35, so that the assembly of parts is a substantially rigid one, and there is relatively little or no opportunity for water leakage within the lamp and none for possibly shorting the conduits to the burner 21. Cables 23 and 24 pass to the binding posts 28 and 29 intermediate said handle 37 and said casing 15.

Members 10 and 15 are joined one to the other by soldering at the top of casing 15 and about the flanged top and bottom of member 10.

At the front of the burner as now assembled there are two aligned circular passages 12 and 40. The wall of said casing 15 cooperates with the adjacent portion of the body 10 to form the circular chamber 20 and the chambers 16 and 17, as previously recited.

At the top and bottom of the casing the caps 41 and 42 through which apertures are arranged for the cables 23 and 24 impinge upon said casing 15, thus forming air space between the member 10 and the cover portions 41 and 42 of the device. Each of the caps 41 and 42 is cut away to allow ready but firm seating on member 10 without interference from handle 37.

Within the apertures 40 and 15 is a cylindrical sleeve 50 which is internally threaded and which extends from the wall of the member 10 where it penetrates into the flanged opening 12 therein to the front of the burner casing 15 from which it projects. It is generally soldered thereinto at or about the flanged opening 12 and the opening 40. At its front said sleeve 50 has a peripheral groove 51 which provides a seat or mount for the various apparatus adapted to be attached to the burner, such as applicators.

At spaced intervals there are passages 52 through the wall of member 50. Passages 52 are elongated in character and extend entirely about sleeve 50 except for narrow bridges between adjacent passages 52 and are arranged in alignment with and within the circular chamber 20 whereby to receive cooling medium therefrom and to permit of such water freely circulating in order to come directly into contact with the edge of the lens and the lens-holding members now to be described.

The interior portion of member 50 is threaded, as previously stated, almost its entire portion. Against the inside wall thereof and beyond the aperture 52, a ring 60 is seated, the inner wall of which at its periphery is cut in the form of a circular groove to provide a cooling space 62. Adjacent ring 60 is a washer 61 comprising an annular member of the width of the uncut wall of member 60 and adapted to engage said wall of said member 60 which may be grooved or undercut to relieve such washer.

A quartz lens 63 is disposed next within the member 50 and in juxtaposition with the washer 61, the edges of said lens being in substantial alignment with the edge of groove 62 and the periphery of washer 61, said lens being adapted to be secured against said washer or gasket in any suitable manner. Suitable sealing material may be employed therewith. At the opposite side of the lens 63 is a second gasket 61, and a second ring 60, such ring 60 being reversed however as is shown in the illustration, and for reasons which are perfectly manifest. The whole, when closely assembled, provides a secure mounting for lens 63 which is water tight and effective.

The edge of the lens 63 is thus held away from the member 50 through the agency of the ring members 60 and the gaskets 61. Water circulates freely about the rim of lens 63, such water being obtained from annular chamber 20 through the openings 52, such cooling medium being adapted to be admitted to chamber 20 through either passage 18 or 19, and being discharged through the other of said passages.

The entire periphery of the lens 63 is water covered, and there is an additional cross section within the annular collar 50 which extends beyond the edges of the lens 63 which is water cooled. The chamber 20 completely surrounds and covers the lens and lens-supporting medium, adding additional cooling space.

Water passes into the burner-casing through the pipe 35, circulates through the passage 17, 19, 20, about the lens 62 through the passages 50, out again through the passages 18, 16, 13, and 34. At the same time, a portion thereof surrounds the member 10 and cools it. By regulating the flow of the water into passage 35 and out of passage 34, adequate cooling for the lens 63 is secured.

As previously indicated, a lens free at and kept cool about its edges has no tendency to crack, and there can be no disturbance with respect to the effectiveness of the lens 63 because at no time is its face or faces covered with water, the ultra violet rays being adapted to pass through the lens 63 and such lens only. Cleansing such lens is quite simple. All face coating of the lens from or with a cooling medium is avoided, and there is no uncertainty as to the value of the ultra-violet radiation passing therethrough, which is the case when there is a flow of water on one or both sides of such lens.

By the arrangement shown, the burner 21 may be quickly replaced by removing the caps 41 and 42. The lens 63 is adapted to be replaced by the removal of the outer ring 60 and gasket 61. The threading of the interior portion of 50 insures the proper adjustment of the lens 63 with respect to the passageway 20 and the opening 52, and also facilitates the ready and rapid replacement of the lens 63 should there ever be any occasion for such replacement.

The whole apparatus provides a marked advance in ultra-violet ray burners, per se, and in addition thereto provides a novel and unique means for mounting any lens for cooling.

It is manifest that the structure may be modified in a number of ways while still keeping within the spirit of the invention, and therefore it is not the desire of the applicant to be limited to the precise structure here shown, but on the contrary, the limitations to the invention are to be measured by the claims hereto appended read in their broadest sense, such claims being directed primarily to a water-cooled lens, a means for mounting such a lens, and a novel burner for ultra-violet radiation.

I claim:

1. A lens, holding means disposed on the faces of the lens and leaving its periphery uncovered, and means for circulating a cooling liquid to contact with the periphery of said lens.

2. A holder, means for holding a lens by its face within said holder, and leaving the periphery of the lens uncovered and means for circulating a cooling medium in contact with the uncovered periphery of said lens.

3. In combination with a lens, a holder for said lens comprising a cooling chamber about the periphery of said lens, and means for holding said lens in said chamber so that its entire periphery is directly exposed to a liquid in said cooling chamber.

4. A holder having a passage-way thereabout for a cooling medium, means for holding a lens at its opposite surfaces with its entire periphery exposed and forming with said holder a second passage-way about the periphery of said lens, and means for circulating a cooling liquid through said second passage-way.

5. A burner for an ultra-violet lamp comprising a casing having an opening therein, a sleeve in said opening, lens holding means in said sleeve comprising separated members and forming therewith a chamber for a cooling medium, and a lens held on opposite surfaces and away from its periphery between said holding members, the periphery of said lens and an annular edge section thereof being exposed to the cooling medium in said chamber.

6. Holding means for a lens comprising separated lens holding members engaging the lens on its opposite surfaces away from its periphery and adapted to form a chamber for a cooling medium directly contacting the periphery of said lens.

7. A water cooled uviarc burner comprising a casing through which water circulates, a lens, and means in said casing for holding said lens with its entire periphery and an annular rim section adjacent thereto exposed to the influence of said cooling medium.

8. A water cooled uviarc burner comprising a lens, a water jacketed casing thereabout, means in said casing for holding a lens at the opposite sides thereof, and leaving its periphery uncovered, and means for circulating water through said casing and about the exposed periphery of said lens.

EDWARD N. WANTZ.